United States Patent
Miura

(10) Patent No.: US 8,729,840 B2
(45) Date of Patent: May 20, 2014

(54) SENSORLESS CONTROL UNIT FOR BRUSHLESS DC MOTOR

(75) Inventor: Yuichi Miura, Kariya (JP)

(73) Assignee: JTEKT Corporation, Osaka-Shi (JP)

( * ) Notice: Subject to any disclaimer, the term of this patent is extended or adjusted under 35 U.S.C. 154(b) by 86 days.

(21) Appl. No.: 13/490,933

(22) Filed: Jun. 7, 2012

(65) Prior Publication Data

US 2013/0002177 A1 Jan. 3, 2013

(30) Foreign Application Priority Data

Jun. 29, 2011 (JP) .................................. 2011-143790

(51) Int. Cl.
 *H02P 6/04* (2006.01)
(52) U.S. Cl.
 USPC ................. 318/400.11; 318/400.21; 318/430; 318/431
(58) Field of Classification Search
 USPC .......... 318/254, 439, 400.11, 400.21, 400.32, 318/400.34, 700, 430, 431
 See application file for complete search history.

(56) References Cited

U.S. PATENT DOCUMENTS

| | | | |
|---|---|---|---|
| 5,363,028 A | 11/1994 | Mori | |
| 5,455,885 A * | 10/1995 | Cameron | 388/834 |
| 5,857,349 A | 1/1999 | Hamaoka et al. | |
| 6,483,266 B2 * | 11/2002 | Miyazaki et al. | 318/400.34 |
| 6,483,270 B1 * | 11/2002 | Miyazaki et al. | 318/700 |
| 6,570,351 B2 * | 5/2003 | Miyazaki et al. | 318/400.32 |
| 6,703,807 B2 * | 3/2004 | Sakata et al. | 318/700 |
| 6,989,646 B2 * | 1/2006 | Jackson et al. | 318/645 |
| 7,032,699 B2 * | 4/2006 | Sakata et al. | 180/247 |
| 7,095,204 B2 * | 8/2006 | Lee et al. | 318/700 |
| 7,852,026 B2 * | 12/2010 | Yokai et al. | 318/400.21 |
| 2002/0050800 A1 * | 5/2002 | Miyazaki et al. | 318/254 |
| 2002/0113568 A1 * | 8/2002 | Sakata et al. | 318/700 |
| 2002/0171381 A1 * | 11/2002 | Miyazaki et al. | 318/254 |
| 2004/0251070 A1 * | 12/2004 | Sakata et al. | 180/247 |
| 2006/0132075 A1 * | 6/2006 | Lee et al. | 318/439 |
| 2008/0291589 A1 * | 11/2008 | Yokai et al. | 361/33 |
| 2012/0306416 A1 * | 12/2012 | Hano | 318/400.26 |
| 2012/0326642 A1 * | 12/2012 | Miura et al. | 318/400.11 |
| 2013/0002177 A1 * | 1/2013 | Miura | 318/400.11 |

FOREIGN PATENT DOCUMENTS

| | | |
|---|---|---|
| EP | 2 234 267 A2 | 9/2010 |
| JP | A 2004-166436 | 6/2004 |
| JP | A-2005-278320 | 10/2005 |

OTHER PUBLICATIONS

Oct. 23, 2012 Search Report issued in European Patent Application No. EP 12 171 724.3.

* cited by examiner

*Primary Examiner* — Paul Ip
(74) *Attorney, Agent, or Firm* — Oliff PLC

(57) ABSTRACT

When a forced commutation mode ends, a switchover to a sensorless control mode is made. The sensorless control mode immediately after the switchover to the sensorless control mode is executed with a power source current maximum value set at a value higher than a rated current value of a motor. The sensorless control mode immediately after the switchover is executed only over a predetermined period of time, and, after a lapse of the predetermined period of time, a steady sensorless control mode is executed. In the steady sensorless control mode, the power source current maximum value is set at a value equal to the rated current value of the motor.

7 Claims, 2 Drawing Sheets

SENSORLESS CONTROL UNIT FOR BRUSHLESS DC MOTOR

INCORPORATION BY REFERENCE/RELATED APPLICATION

This application claims priority to Japanese Patent Application No. 2011-143790 filed on Jun. 29, 2011 the disclosure of which, including the specification, drawings and abstract, is incorporated herein by reference in its entirety.

BACKGROUND OF THE INVENTION

1. Field of the Invention

The invention relates generally to a sensorless control unit for a brushless direct-current (DC) motor and, more specifically to a sensorless control unit for a brushless DC motor that is suitable for driving a pump that sucks in and discharges oil.

2. Discussion of Background

Hydraulic pressure is supplied to a transmission of a vehicle by a hydraulic pump. In a vehicle that carries out so-called idling stop, which is a technique of stopping an engine when the vehicle stops, in view of, for example, energy-saving, an electric hydraulic pump is used to reliably supply hydraulic pressure to the transmission even during idling stop.

A brushless DC motor is used as an electric motor for driving a pump, which is mounted in a vehicle. In addition, so-called sensorless control for driving the motor without the use of a rotational position detection sensor is executed.

In order to execute the sensorless control over the brushless DC motor, it is necessary to estimate the rotational position of a rotor and generate an estimated rotational position signal that corresponds to a rotational position signal from a rotational position detection sensor. The estimated rotational position signal is usually generated with the use of three-phase induced voltages of the motor. However, when the rotor is not rotating or is rotating at a low speed during start-up of the motor, induced voltages are zero or low. Therefore, it is not possible to generate an estimated rotational position signal. Accordingly, as described in, for example, Japanese Patent Application Publication No. 2005-278320 (JP 2005-278320 A), the pattern of electric power supply to the three phases is forcibly changed at regular intervals to generate a revolving magnetic field to thereby carry out forced commutation for forcibly rotating the rotor.

In addition, a conventional sensorless control unit for a brushless DC motor executes a sensorless control mode using the rated current value of a motor as the maximum current value.

When the above-described conventional sensorless control unit for a brushless DC motor is applied to a brushless DC motor for driving a hydraulic pump for a transmission of a vehicle, the following problem may occur. When the hydraulic load is high (the oil temperature is low), it takes a long time to bring the hydraulic pressure to a required hydraulic pressure. This makes it difficult to start up the motor promptly.

SUMMARY OF THE INVENTION

The invention provides a sensorless control unit for a brushless DC motor, which is able to promptly start up a motor even when a load is high.

According to a feature of an example of the invention, in a sensorless control unit for a brushless DC motor, which sets a forced commutation mode to rotate the brushless DC motor during start-up of the brushless DC motor and makes a switchover to a sensorless control mode when a rotor position becomes detectable, a power source current maximum value immediately after the switchover from the forced commutation mode to the sensorless control mode is set at a value higher than a rated current value of the motor.

According to another feature of an example of the invention, the brushless DC motor that is controlled by the sensorless control unit is used to drive a hydraulic pump. In this case, even when a hydraulic load is high (an oil temperature is low), a required hydraulic pressure is reliably reached within a predetermined period of time after the start-up of the motor while a load (overload) on the motor is suppressed.

BRIEF DESCRIPTION OF THE DRAWINGS

The foregoing and further objects, features and advantages of the invention will become apparent from the following description of example embodiment with reference to the accompanying drawings, wherein like numerals are used to represent like elements and wherein.

DETAILED DESCRIPTION OF EMBODIMENTS

Hereinafter, an embodiment of the invention will be described with reference to the accompanying drawings.

Figure 1:
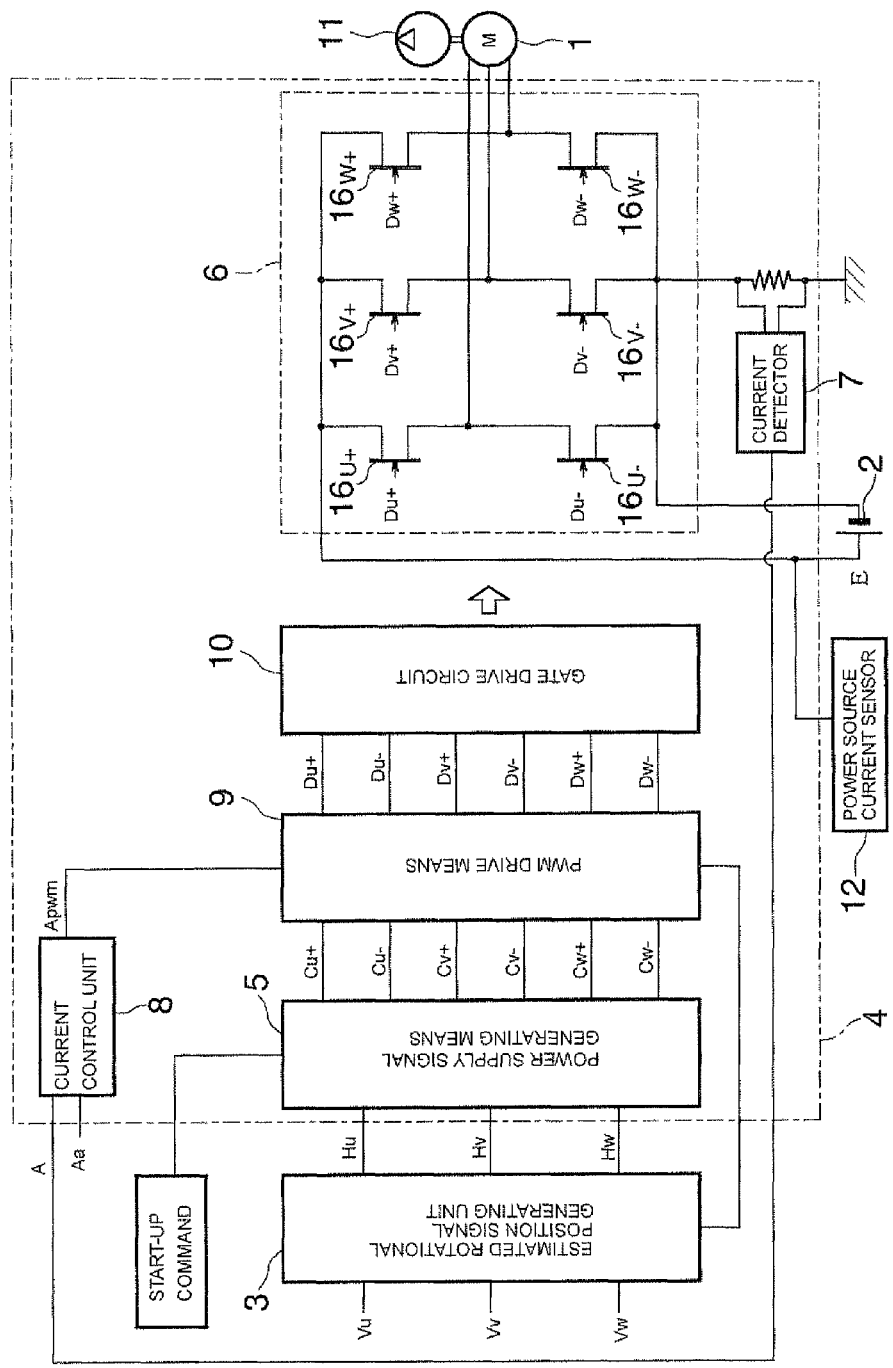
FIG. 1 is a block diagram that shows a sensorless control unit for a brushless DC motor according to an embodiment of the invention.

FIG. 1 schematically shows the configuration of a sensorless control unit for a brushless DC motor.

The sensorless control unit for a brushless DC motor drives a brushless DC motor 1 with the use of a direct-current power source 2 formed of a battery mounted in a vehicle, in a one-sided PWM mode. The brushless DC motor 1 is mounted in the vehicle, and drives a pump 11 that sucks in and discharges oil. The sensorless control unit includes an estimated rotational position signal generating unit 3 that is estimated rotational position signal generating means for generating estimated rotational position signals regarding respective three phases in a digital mode based on phase voltages of the respective three phases, and power supply control unit 4 that is power supply control means for controlling power supply from the direct-current power source 2 to the three phases in a PWM mode based on the estimated rotational position signals regarding the respective three phases.

The estimated rotational position signal generating unit 3 generates estimated rotational position signals Hu, Hv and Hw regarding the respective three phases, based on the phase voltages Vu, Vv and Vw of the respective three phases, that is, the U phase, V phase and W phase of the motor 1.

The power supply control unit 4 includes power supply signal generating means 5, a switching circuit 6, a current detector 7, a current control unit 8, PWM drive means 9, and a gate drive circuit 10.

The power supply signal generating means 5 generates power supply signals Cu+, Cu−, Cv+, Cv−, Cw+ and Cw− for controlling power supply to respective elements based on the estimated rotational position signals Hu, Hv and Hw generated by the estimated rotational position signal generating unit 3. The power supply signal generating means 5 may be formed of a microprocessing unit (MPU) or may be formed of an exclusive digital circuit.

The switching circuit 6 includes an upper arm switching element 16u+ and a lower arm switching element 16u− that control power supply from the power source 2 to the U phase of the motor 1, an upper arm switching element 16v+ and a lower arm switching element 16v− that control power supply from the power source 2 to the V phase of the motor 1, and an upper arm switching element 16w+ and a lower arm switching element 16w− that control power supply from the power source 2 to the W phase of the motor 1.

The current detector 7 connects a current measurement circuit to the switching circuit 6 to detect a motor current. A total value of currents passing through the U-phase, V-phase and W-phase stator coils of the motor 1 is detected by the current detector 7.

A power source current that flows from the direct-current power supply 2 to the U-phase, V-phase and W-phase stator coils of the motor 1 via the switching circuit 6 is detected by a power source current sensor 12.

The current control unit 8 compares a detected current value A of the motor 1, detected by the current detector 7, with a current command value Aa, generates a current control signal Apwm for driving the motor 1 in a PWM mode based on the magnitude relation between the detected current value A and the current command value Aa, and then transmits the current control signal Apwm to the PWM drive means 9. The current control unit 8 determines the magnitudes of currents that are passed through the U-phase, V-phase and W-phase stator coils of the motor 1 when the current command value Aa is the maximum value, and restricts the maximum value of the current to a value equal to or lower than a predetermined value.

The PWM drive means 9 generates switching element control signals Du+, Du−, Dv+, Dv−, Dw+ and Dw− for the respective switching elements based on the received power supply signals and current control signal Apwm, and then outputs the switching element control signals Du+, Du−, Dv+, Dv−, Dw+ and Dw− to the gate drive circuit 10.

The gate drive circuit 10 turns on or off the switching elements based on the received switching element control signals to generate a revolving magnetic field over the stator coils of the motor 1.

In FIG. 1, at the time of start-up of the motor 1, a forced commutation mode is selected, and a start-up command is transmitted to the power supply signal generating means 5. The power supply signal generating means 5 provides the PWM drive means 9 with the power supply pattern stored in a memory upon reception of the start-up command. This is carried out irrespective of the rotor position of the motor 1. A prescribed current is supplied from the direct-current power source 2 based on a value stored in the memory of the PWM drive means 9 instead of based on the current control signal Apwm from the current control unit 8. The current value is set to be higher than the rated current of the motor 1. The PWM drive means 9 outputs switching element control signals for the switching elements to the gate drive circuit 10 based on the power supply signals from the power supply signal generating means 5. Thus, the switching elements are turned on or off, and a revolving magnetic field for forced commutation is generated over the stator coils of the motor 1.

By carrying out forced commutation, the phase voltages Vu, Vv and Vw of the U phase, V phase and W phase of the motor 1 increase. Thus, the estimated rotational position signal generating unit 3 is able to generate the estimated rotational position signals Hu, Hv and Hw for respective three phases (that is, the rotor position is detectable). Thus, the power supply signal generating means 5 generates power supply signals based on the estimated rotational position signals Hu, Hv and Hw generated by the estimated rotational position signal generating unit 3. The PWM drive means 9 generates switching element control signals for the respective switching elements based on the power supply signals and the current control signal Apwm from the current control unit 8, and transmits the switching element control signals to the gate drive circuit 10. In this way, a switchover from the forced commutation mode to a sensorless control mode is made.

The current control unit 8 executes post-switchover initial sensorless control (first sensorless control mode), in which the power source current maximum value is set at a value higher than the rated current value, over a predetermined period of time immediately after a switchover to the sensorless control mode is made. Then, a switchover is made to steady sensorless control (second sensorless control mode), in which the power source current maximum value is set at a value equal to the rated current value.

In the first sensorless control mode, the current command value Aa is maintained at the maximum value of 100% (100% is the maximum value), and the power source current maximum value for the first sensorless control mode is set through calculation executed by the current control unit 8. At the time of a switchover to the second sensorless control mode, the current control unit 8 changes the power source current maximum value to the rated current value.

Figure 2:
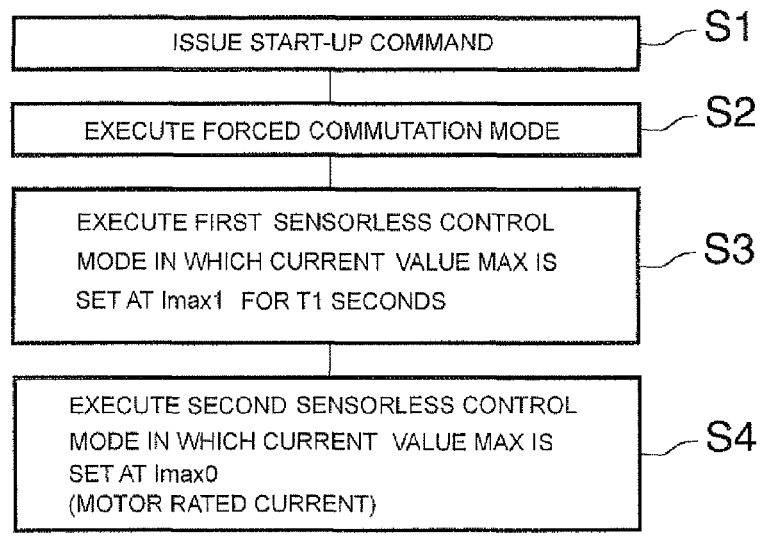
FIG. 2 is a flowchart that shows steps executed to make a switchover from a forced commutation mode to a sensorless control mode in the embodiment.

FIG. 2 shows a flowchart showing steps executed to make a switchover from the forced commutation mode to the sensorless control mode.

In the flow chart, the forced commutation mode is executed (S2) on the basis of a start-up command (S1). When the forced commutation mode (S2) ends, a switchover to the first sensorless control mode is made (S3). The first sensorless control mode (S3) immediately after the switchover is executed with the power source current maximum value set at a value Imax1 that is higher than the rated current value Imax0 of the motor 1. Thus, immediately after the switchover to the sensorless control mode, a current that is higher than the rated current value Imax0 is passed through the motor 1. As a result, it is possible to obtain high torque. The first sensorless control mode (S3) is executed only over a predetermined period of time (for T1 seconds), and, after a lapse of the predetermined period of time, the second sensorless control mode is executed (S4). The second sensorless control mode (S4) is a steady sensorless control mode in which the power source current maximum value is set at a value equal to the rated current value Imax0 of the motor 1. The period of time T1 over which the first sensorless control mode (S3) is executed, that is, the period of time T1 over which sensorless control where the power source current maximum value is set at a value higher than the rated current value is executed, is limited to a short predetermined period of time (for example, shorter than 1 second). Thus, a load on the motor 1 is suppressed, and the safety is ensured.

Figure 3:
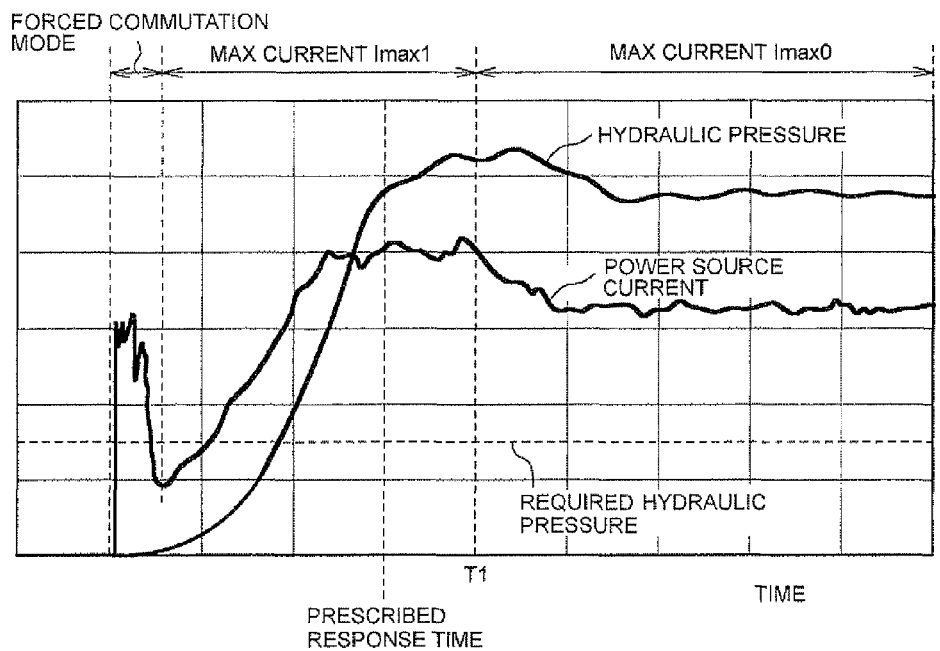
FIG. 3 is a graph that shows temporal changes in the hydraulic pressure and the power source current when a brushless DC motor provided with the sensorless control unit according to the embodiment is used to drive a hydraulic pump.

FIG. 3 shows temporal changes in the hydraulic pressure and the power source current when the motor 1 is used to drive the pump 11.

In the graph, when the forced commutation mode ends and a switchover to the sensorless control mode is made, the hydraulic pressure increases with an increase in the rotation speed of the motor 1. The power source current value detected by the power source current sensor 12 also increases with the rotation speed. Immediately after a switchover to the first sensorless control mode, the power source current maximum value is set at the value Imax1 that is higher than the rated current value Imax0. Therefore, the torque of the motor 1 becomes high, and a required hydraulic pressure is reached within a short period of time.

In the above configuration, the rated current value Imax0 of the motor 1 is set such that the required hydraulic pressure is reached within a prescribed response time even when the hydraulic load is high due to, for example, a low oil temperature. The power source current maximum value Imax1 immediately after a switchover to the first sensorless control mode and the period of time T1 over which control is executed at the power source current maximum value Imax1 are set on the basis of the required hydraulic pressure and the prescribed response time within which the required hydraulic pressure is reached. For example, the power source current maximum value Imax1 immediately after a switchover to the first sensorless control mode is set at a value obtained by multiplying the rated current value Imax0 by a value within a range from 1.2 to 2.0, and the period of time over which control is executed at the power source current maximum value Imax1 immediately after the switchover is set at, for example, a value that is longer than or equal to 0.2 seconds and shorter than 1.0 second. In addition, the current value in the forced commutation mode is set at a value between the rated current value Imax0 and the power source current maximum value Imax1 immediately after a switchover to the first sensorless control mode. The rated current value Imax0, the power source current maximum value Imax1 immediately after a switchover to the first sensorless control mode and the period of time T1 over which control is executed at the power source current maximum value Imax1 are appropriately set for each motor. Thus, even when the motor is replaced, it is possible to easily cope with the change.

In the above embodiment, the brushless DC motor 1 that is used to drive the in-vehicle electric hydraulic pump 11 is described. However, the invention is applicable to sensorless control units for any brushless DC motors that employ a 120-degree rectangular wave energization drive method.

Note that, in the block diagram shown in FIG. 1, in addition to or instead of the current control unit 8, a speed control unit may be provided. The speed control unit compares a detected rotation speed value of a rotor of the motor 1 with a set rotation speed value that includes a rotation direction and that is externally transmitted, generates a speed control signal for driving the motor 1 in a PWM mode based on the magnitude relation between the detected rotation speed value and the set rotation speed value, and outputs the speed control signal to the PWM drive means 9.

What is claimed is:

1. A sensorless control unit for a brushless DC motor, comprising:
   a power supply signal control unit that, in response to a start-up command, is configured to set a forced commutation mode to rotate the brushless DC motor during start-up of the brushless DC motor and make a switchover to a sensorless control mode when a rotor estimated position becomes detectable, wherein the power supply control unit comprises:
   a current detector;
   a power supply signal generating member that generates power supply signals for controlling power to respective elements based on a startup signal or estimated rotational position signals;
   a current control unit that is configured to set a power source current maximum value after the switchover from the forced commutation mode to the sensorless control mode at a value higher than a rated current value of the motor based on a current signal received from the current detector.

2. The sensorless control unit for a brushless DC motor according to claim 1, wherein
   over a predetermined period of time immediately after the switchover from the forced commutation mode to the sensorless control mode, the power source current maximum value is set at a value higher than the rated current value of the motor.

3. The sensorless control unit for a brushless DC motor according to claim 1, wherein the sensorless control unit controls the brushless DC motor that drives a pump that sucks in and discharges oil.

4. A method comprising:
   setting, in response to a start-up command and by a sensorless control unit for a brushless DC motor, a forced commutation mode to rotate a brushless DC motor during start-up of the brushless DC motor;
   making a switchover to a sensorless control mode when a rotor estimated position becomes detectable; and
   setting a power source current maximum value after the switchover from the forced commutation mode to the sensorless control mode at a value higher than a rated current value of the motor.

5. A system for a brushless DC motor, comprising:
   a sensorless control unit that is configured to:
   set a forced commutation mode, in response to a start-up command, to rotate the brushless DC motor during start-up of the brushless DC motor, and
   make a switchover to a sensorless control mode when a rotor estimated position becomes detectable,
   wherein a power source current maximum value immediately after the switchover from the forced commutation mode to the sensorless control mode is set at a value higher than a rated current value of the motor.

6. The system according to claim 5, wherein
   over a predetermined period of time immediately after the switchover from the forced commutation mode to the sensorless control mode, the power source current maximum value is set at a value higher than the rated current value of the motor.

7. The system according to claim 5, wherein the sensorless control unit controls the brushless DC motor that drives a pump that sucks in and discharges oil.

* * * * *